Figure 3:
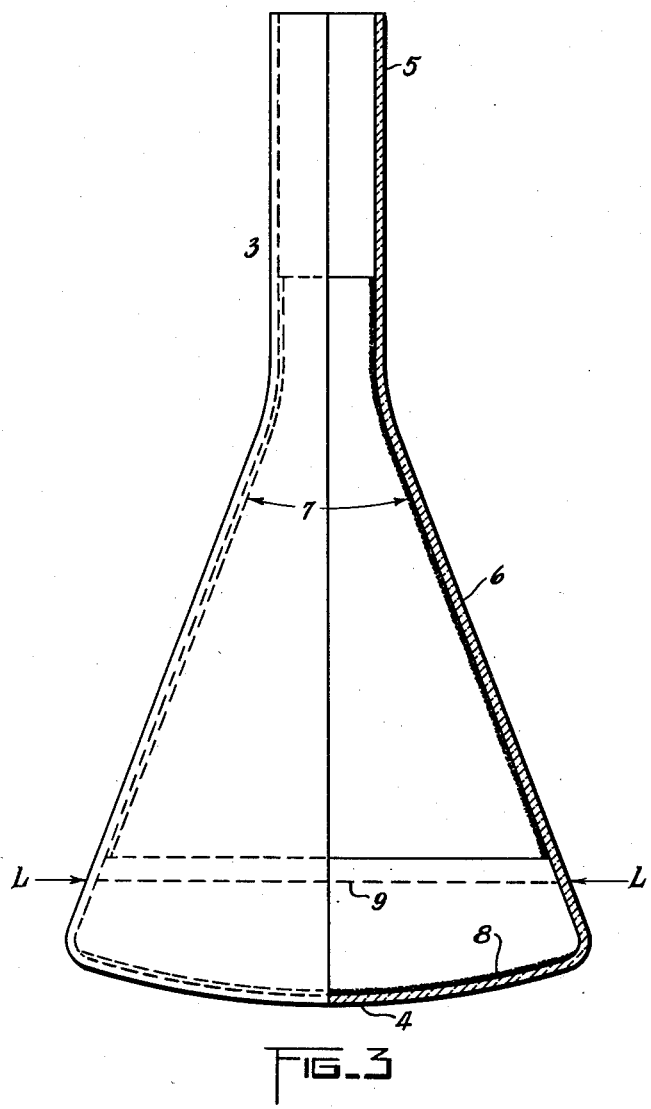

June 13, 1950 B. S. ELLEFSON 2,511,572
LUMINESCENT SCREEN AND METHOD OF MANUFACTURE
Filed Sept. 7, 1946 2 Sheets—Sheet 1
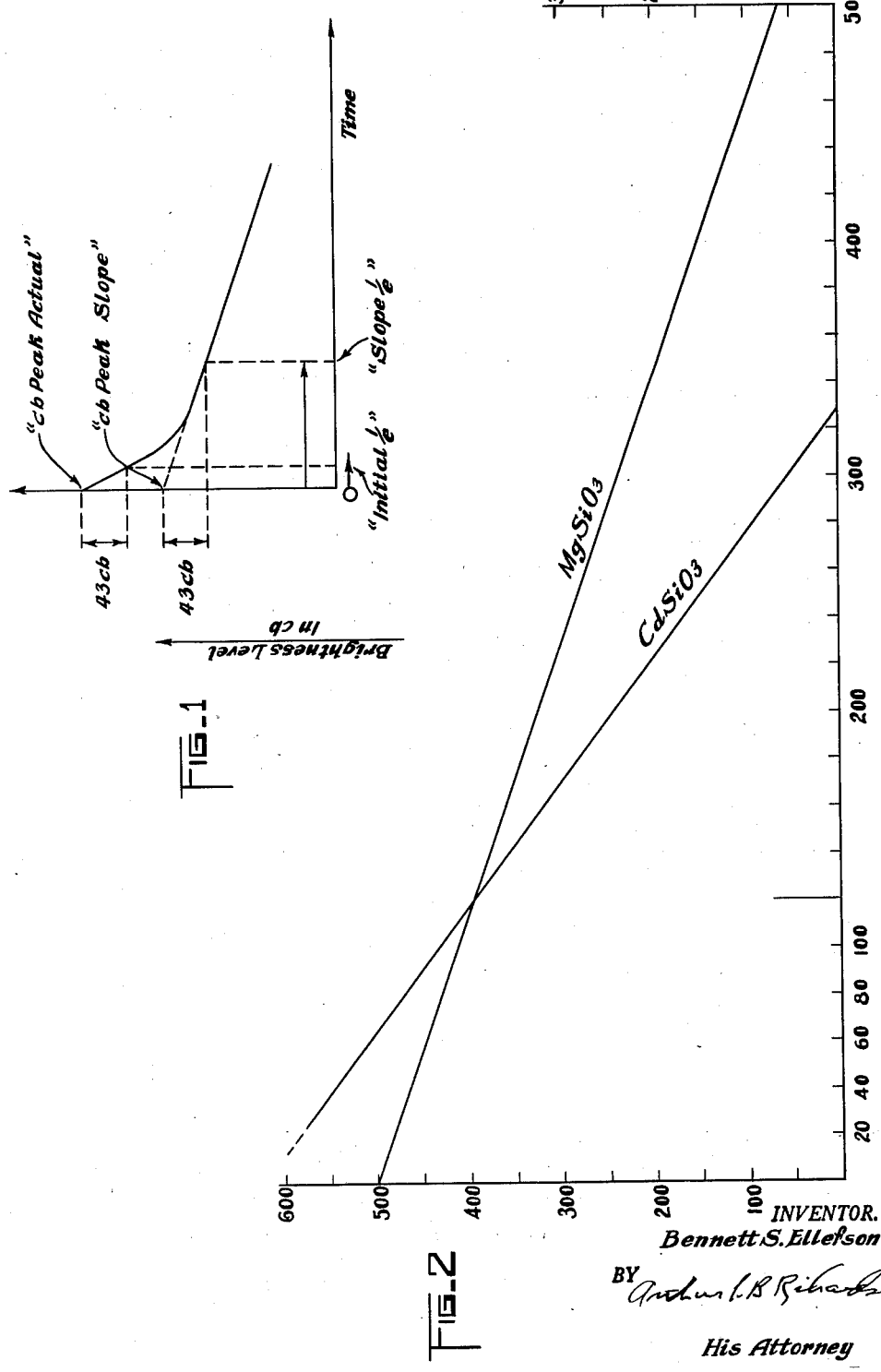
INVENTOR.
Bennett S. Ellefson
BY
His Attorney June 13, 1950      B. S. ELLEFSON      2,511,572
LUMINESCENT SCREEN AND METHOD OF MANUFACTURE
Filed Sept. 7, 1946      2 Sheets-Sheet 2

INVENTOR.
Bennett S. Ellefson
BY Arthur C B Richardson
His Attorney

Patented June 13, 1950

2,511,572

UNITED STATES PATENT OFFICE 2,511,572

LUMINESCENT SCREEN AND METHOD OF MANUFACTURE

Bennett S. Ellefson, Bayside, N. Y., assignor to Sylvania Electric Products, Inc., a corporation of Massachusetts Application September 7, 1946, Serial No. 695,507

3 Claims. (Cl. 250—164)

My invention relates to luminescent screens and more particularly to screens which have application in electronic devices which require the screen to have a relatively long brightness decay characteristic, such as is the case of some cathode ray tubes and to a method of preparing the luminescent screens.

In certain applications it is desired to observe on the screens of cathode ray tubes phenomena which repeat themselves substantially at a rate of 1 or 2 per second. In these cases the luminescent decay rate of the screen after excitation should be long enough to avoid objectionable "flicker." In addition, it is sometimes desirable that the emission spectrum of the luminescent material used in the preparation of the screen be far toward the red end, for example in cases where the observation on the screen is made at night, and the night vision of the observer should not be impaired.

The ideal decay characteristics of such luminescent materials subsequent to excitation would be a constant brightness with an instantaneous cut-off of light emission after the desired period, say about ½ second. The actual decay of light emission after excitation is, however, continuous, usually beginning with a very high intensity at the instant of excitation, followed by a sudden decrease in brightness with a short period after excitation. A close approach to the above ideal decay characteristic is one having essentially an exponential decay characteristic. Log brightness vs. time equals straight line. Other materials having a decay characteristic in which log brightness follows decay law of $$\frac{1}{t^n}$$

(bi-molecular decay) decay more rapidly initially but more slowly in the later stages of decay.

Although materials have been used in the past which have an exponential decay function they have not been of the type which had both a stable luminescent characteristic when stimulated by high temperatures and by electron bombardment and a maximum luminescent emission which falls within the range of wave lengths far toward the red end of the spectrum.

It is therefore an object of my invention to provide a luminescent screen for cathode ray tubes which has a decay characteristic adapted to a repetition rate of 1 to 2 per second without objectionable flicker.

It is a further principal object of my invention to provide luminescent screens for cathode ray tubes whose maximum luminescent emission falls in the range of wave lengths far toward the red end of the spectrum to aid night observation.

It is a still further object to provide a composition for a luminescent material which has the desired luminescent emission spectrum and decay characeristic after excitation by electron bombardment.

In accordance wth my invention these and other advantages which are incidental to its application can be obtained by preparing the luminescent screen from a material consisting primarily of a manganese activated magnesium meta-silicate.

In the drawing,

Figs. 1 and 2 illustrate brightness-decay characteristics which will be employed in a description of my invention, and Fig. 3 is a diagrammatic representation of a cathode ray tube to which my improved fluorescent screen material has been applied.

Referring to Fig. 1, I have illustrated by a characteristic curve what is meant by a brightness-decay characteristic, and in the figure a logarithmic function of brightness is plotted on the ordinate axis and time on the abscissa axis.

The brightness of a luminescent source may be expressed in terms of centibels (abbreviated cb). This logarithmic unit is convenient to use in analogy to the decibel widely known for the characterization of noise in accoustics.

The conversion from the usual brightness units, viz., foot lamberts and millilamberts to the centibel unit is given by the equation $X$ (foot lamberts) $=2.10y$ (cb)$/100._{10}-6$ (1). As a foot lambert is equal to 1.076 millilamberts, a foot lambert is roughly equal to a millilambert. The threshold of visibility of the human eye (not adapted to perfect darkness) has been found to be about 0.2 microlambert, or very nearly equal to 0.2 millifoot lambert. According to equation 1, 0.2 millifoot lambert corresponds to about 200 cb.

It is convenient to draw the brightness decay characteristics of a luminescent material as a function of time in a diagram in which the cb is plotted vs. time in milliseconds. The curves of Figs. 1 and 2 are plotted in the reference system. The abscissa axis is the time ($t$) and brightness in centibels is measured along the ordinate axis.

In this scale of brightness the decay curve consists substantially of two parts connected by a curved portion: a first steep, approximately straight line portion, immediately following excitation. The intersection of this line with the cb axis (i. e., for $t=0$) is called cb peak actual. This is indicated in Fig. 1 by the legend "cb peak actual."

The time constant of this section, i. e., time required for light to decrease by a value of $1/e$, can be directly read in milliseconds as the abscissa of the point in which the continuation of the first steep line section intersects with a parallel to the time axis through the point on cb axis having the ordinate cb peak actual minus 43 cb.

This time is called initial $1/e$. It represents the period of time it would take to reduce the brightness of the flash to $1/e$ of its value at excitation, as shown at the beginning of the time axis in Fig. 1.

The second part of the cb curve is again approximately a straight line of smaller steepness. This second straight line section begins after the short period of initial sudden decay and prevails for the relatively long portion of total decay time. The continuation of this line in the diagram intersects the cb axis in a point called cb peak slope, which is characteristic of each material. Finally, the "slope $1/e$" time constant is the abscissa of the point in which the second section of the cb vs. time curve intersects a parallel to the time axis through a point of the ordinate axis 43 cb below the cb peak slope. These points are indicated clearly in Fig. 1. This "slope $1/e$" time constant is the significant characteristic in comparing performance of materials.

If one is interested in the relative values of the time constant of different sections of the decay curve or of two decay curves representing different materials, it is only necessary to compare the curves in regard to their steepness. The steeper curve has the shorter time constant.

Although various types of silicates have heretofore been employed as luminescent material and although they have been formed to produce relatively stable screens, they have exhibited relatively short time constants.

I have, however, found that when bombarded by electrons, screens produced with manganese activated magnesium meta-silicate not only have a luminescent emission which falls toward the red end of the spectrum namely 6300–6800 Angstrom units with a sharp cut off of about 5200 Å. but also have a relatively long time constant value. They also possess particularly stable luminescent characteristics superior to other exponential decay material having long time constant, for example manganese activated zinc fluoride and manganese activated zinc magnesium fluoride.

The magnesium meta-silicate screens of this invention are generally characterized by lower values of cb peak actual and cb peak slope than the cadmium silicate which is one of the luminescent materials normally sold as an article of commerce. The slope $1/e$ time constant of the magnesium meta-silicate has a value of about 60–70 milliseconds and "initial $1/e$" time constant of about 30 milliseconds. This compares with a slope "$1/e$" time constant of 28 milliseconds, and initial $1/e$ time constant of 13 milliseconds for cadmium silicate. The significance of this difference in time constant is clearly brought out in Fig. 2 of the drawing which shows that although the initial brightness as measured in centibels of cadmium silicate is considerably higher under standard conditions of excitation than is that of the magnesium meta-silicate, the steepness of the slope for the cadmium silicate is such in comparisons with that of the magnesium meta-silicate that the brightness is less than that of the magnesium silicate after a very short time, namely 120 milliseconds. As a result the absolute value of brightness after a period, for example 250 milliseconds following excitation, is higher for the magnesium meta-silicate. This results in a screen having lower flash and a higher level of brightness at time intervals of interest in connection with the observation of phenomena in which the repetition rate is of the order of 2 per second.

As a result of life tests conducted on screens made of magnesium meta-silicate it has been found that they further have a remarkable ability with respect to maintenance of cb and time constant values on life. It is furthermore of interest to note that the initial $1/e$ time constant of the screen examined actually increased in the early hours of life. This is the direct opposite of experience with other screens. For example, the fluoride screens which possess a very high time constant and are therefore considered to be very superior screens.

Although it has been found that magnesium meta-silicate can be prepared in many different ways it has been found that the luminescent powder obtained in accordance with the following method is extremely well adapted for use in the production of luminescent screens of the type used in cathode ray tubes.

In accordance with this preferred method of preparation, a water suspension of basic magnesium carbonate, silicic acid, and manganese carbonate is milled in a pebble mill for 6 hours. The proportion of the respective ingredients are so chosen that after firing a compound results which consists substantially of magnesium meta-silicate containing 0.5% by weight of manganese. After milling the mixture is dried at about 110° C., after which 10 per cent by weight of potassium chloride is added and intimately mixed therewith by further milling. The combination of dry powder is placed in a crucible which is preferably made of porcelain and inserted in another crucible made of graphite. These are then fired at a temperature of 1100° C. for 30 minutes.

In the preferred process the fired mass is milled in a Pyrex rod mill with water as a vehicle. The milled suspension is then sieved through a 325 mesh stainless steel sieve, in order to free it of any undesirably large particles.

The dried 325-mesh powder may then be applied as a screen to a cathode ray tube face by any of the conventional methods, such as spraying, air-settling, liquid settling, or lacquer flowing, as the resulting powder is of such size and character that it can be made to adhere to glass surfaces without the aid of any binder. It has been established that very good screens can be made by liquid settling from a very dilute solution of an alkali metal silicate for example (1%) of potassium silicate.

Settling of the screens from the dilute suspension of potassium silicate may, for example, be carried out in the usual manner. The suspension is spilled into a cathode ray tube bulb, see Fig. 3, with the bulb resting on its viewing window 4. The silicate suspension is spilled in through the neck 5 of the cathode ray tube up to a convenient level, L—L of the conical part 6 of the bulb. Screen 8 is formed on window 4 by the particles settling from the suspension 9. The cathode ray tube can then be processed with the normal sequence of operations. In the event that the graphite conductive coating 7 is applied to a part of neck 5 and of conical part 6 of bulb 3 after the screening operation, a satisfactory baking schedule consisting of a pre-bake of ½ hour at 350° with a flow of dry air through the coated bulb following by an exhaust bake of ½ hour at 330°. If a conductive coating such as silver has been applied and processed previous to the screen operation in which a non-aqueous medium without auxiliary binder was used, then the step of pre-baking may be eliminated. While the above description discloses preferred and practical embodiments of the luminescent screen, and the method of making them, it will be understood by those skilled in the art that the specific details described are by way of limitation and are not to be viewed as limiting the scope of the invention.

What I claim is:

1. A luminescent screen suitable for use in a cathode ray tube comprising a support covered with a thin film of a manganese activated magnesium metasilicate, said screen having a peak luminescent emission when stimulated by electron bombardment extending between the wave lengths 6300 Angstrom units to 6800 Angstrom units and a cut off toward shorter wave lengths in the visible spectrum of 5200 Angstrom units.

2. A cathode ray tube having a screen comprising a glass support provided with a thin coating of a manganese activated magnesium metasilicate, said screen having a decay characteristic after excitation which is characterized by a "slope $1/e$" time constant of about 70 milliseconds and an "initial $1/e$" time constant of about 30 milliseconds.

3. A luminescent screen for use in a 2-image per second television reproduction apparatus comprising a support covered by a thin film of manganese activated magnesium metasilicate.

BENNETT S. ELLEFSON.

REFERENCES CITED

The following references are of record in the file of this patent:

UNITED STATES PATENTS

| Number | Name | Date |
|---|---|---|
| 1,954,691 | De Boer | Apr. 10, 1934 |
| 2,118,091 | Leverenz | May 24, 1938 |
| 2,137,118 | Schleede | Nov. 15, 1938 |
| 2,185,439 | Hinderer | Jan. 2, 1940 |
| 2,260,924 | Swindells | Oct. 28, 1941 |

OTHER REFERENCES

Randall, Proc. Roy Soc. London Series A 170 (1939), pp. 273, 282.